(12) United States Patent
Chen et al.

(10) Patent No.: US 7,025,809 B2
(45) Date of Patent: Apr. 11, 2006

(54) DUAL-TYPE AIR PURIFICATION SYSTEM

(75) Inventors: Yung-Dar Chen, Hsinchu (TW); Po-Sung Kuo, Tainan (TW); Yen-Chun Wang, Taipei (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 49 days.

(21) Appl. No.: 10/732,362

(22) Filed: Dec. 11, 2003

(65) Prior Publication Data

US 2005/0126393 A1    Jun. 16, 2005

(51) Int. Cl.
*B01D 47/06* (2006.01)

(52) U.S. Cl. .............................. 95/224; 95/225; 96/297

(58) Field of Classification Search ............... 55/385.2, 55/423; 95/187, 199, 224, 225, 228; 96/234, 96/274, 277, 297, 396; 454/187
See application file for complete search history.

(56) References Cited

U.S. PATENT DOCUMENTS

| | | | | |
|---|---|---|---|---|
| 3,907,523 A * | 9/1975 | Melin, Jr. | ..................... | 95/224 |
| 4,579,569 A * | 4/1986 | Sheng et al. | ................... | 96/265 |
| 5,626,820 A * | 5/1997 | Kinkead et al. | ............. | 422/122 |
| 5,643,797 A * | 7/1997 | Schmidt et al. | ............... | 436/55 |
| 5,660,615 A * | 8/1997 | Neumann et al. | ............. | 95/187 |
| 6,059,866 A | 5/2000 | Yamagata et al. | | |
| 6,387,165 B1 | 5/2002 | Wakamatsu | | |
| 6,451,096 B1 * | 9/2002 | Kim | ............................ | 96/270 |
| 6,623,546 B1 * | 9/2003 | Bourdel | ....................... | 95/199 |
| 2002/0011150 A1 * | 1/2002 | Wakamatsu et al. | .......... | 95/214 |

* cited by examiner

*Primary Examiner*—Frank M. Lawrence
(74) *Attorney, Agent, or Firm*—Birch, Stewart, Kolasch & Birch, LLP

(57) ABSTRACT

An air purification system for treating pollutants in a gas stream. The air purification system includes a housing with a plurality of nozzles, an acidic water supply device and an alkaline water supply device. The housing introduces the gas stream. The acidic water supply device supplies acidic water for first nozzles to spray acidic mist. The alkaline water supply device supplies alkaline water for second nozzles to spray alkaline mist. The acidic mist and alkaline mist neutralize acidic gas and alkaline gas contained in the gas stream.

33 Claims, 3 Drawing Sheets

DUAL-TYPE AIR PURIFICATION SYSTEM

BACKGROUND OF THE INVENTION

1. Field of the Invention

The present invention relates to air purification systems for manufacturing cleanrooms, and in particular to an air purification system which utilizes acidic mist and alkaline mist.

2. Description of the Related Art

Generally, integrated circuit manufacturing involves deposition of a thin dielectric or conductive film on the wafer using oxidation or any of a variety of chemical vapor deposition processes; formation of a circuit pattern on a layer of photoresist material by photolithography; placement of a photoresist mask layer corresponding to the circuit pattern on the wafer; etching of the circuit pattern in the conductive layer on the wafer; and stripping of the photoresist mask layer from the wafer. Each of these steps, particularly the photoresist stripping step, provides abundant opportunity for organic, metal, and other circuit-contamination sources.

In the semiconductor fabrication industry, minimization of particle contamination on semiconductor wafers is getting more and more important as the integrated circuit devices on the wafers decrease in size. With the reduced size of the devices, a contaminant having a particular size occupies a relatively larger percentage of the available space for circuit elements on the wafer compared to larger devices in the past. Moreover, the presence of particles in the integrated circuit affects the functional integrity of the devices in the finished electronic product. To achieve an ultraclean wafer surface, particles must be removed from the environment, and particle-removing methods are therefore of utmost importance in the fabrication of semiconductors.

Because minimization of particles on wafers throughout the IC manufacturing process is critical, the environment within which the IC manufacturing process is carried out must be subjected to stringent controls of airborne particles which would otherwise enter the manufacturing environment from the sources outside the IC manufacturing facilities. Currently, mini-environment based IC manufacturing facilities are equipped to control airborne particles much smaller than 1.0 µm. Accordingly, modern semiconductor manufacturing is carried out in a complex facility known as a cleanroom. The cleanroom is isolated from the outside environment and subjected to a stringent control of contaminants including airborne particles, metals, organic molecules and electrostatic discharges (ESDs), as well as environmental parameters such as temperature, relative humidity, oxygen and vibration. Along with a sophisticated system of filters and equipment, a comprehensive and strictly-enforced set of procedures and practices are imposed on facility personnel in order to maintain a delicate balance of these clean air requirements and parameters for optimal IC fabrication.

A modern cleanroom used in the fabrication of integrated circuits includes one large fabrication room having a service access corridor that extends around the perimeter of the cleanroom and a main manufacturing access corridor that extends across the center of the cleanroom. Production bays, which accommodate the semiconductor fabrication tools, are located on respective sides of the main manufacturing access corridor. The outside air enters the cleanroom through an air purification system, which is located above the ceiling of the cleanroom and includes particulate filters, typically HEPA (high-efficiency particulate air) filters. Through openings in the ceiling, the air is drawn downwardly in a continuous laminar flow path from the air purification system, through the cleanroom and openings in the floor into an air recirculation system. The air recirculation system may turn the air over every six seconds in order to achieve ultraclean conditions during disturbances such as changes in personnel shifts. An exhaust system removes heat and chemicals generated during the fabrication processes.

U.S. Pat. No. 6,059,866 teaches an air scrubber that eliminates dust or harmful gases in air, reduces the supply of pure water used as clean water, and performs humidification with high saturation efficiency. Moreover, U.S. Pat. No. 6,387,165 teaches an airborne molecular contaminant removal apparatus applied to remove airborne chemical contaminants such as particulate contaminants or airborne molecular contaminants from the outside air.

FIG. 1 is an example of a conventional air purification system 10 used to purify outside air 38 drawn through the system 10 and into a semiconductor fabrication facility cleanroom (not shown). The air purification system 10 includes an elongated housing 12 having an intake end 14. A blower 18 pumps the outside air 38 into the intake end 14 and then initially through a pre-filter 16 in the housing 12, where pre-filter 16 removes particles from the air 38 if the particles are larger than a selected size. The air then flows through an upstream cooling coil 20, which cools the air to a temperature at or below the dew point in such a manner that moisture in the air coalesces into water droplets 44, as shown in FIG. 2. Multiple nozzle conduits 22, each equipped with multiple spray nozzles 24, are provided in the housing 12. Each nozzle 24 generates a water spray 25 that contains a fine mist of additional water droplets 44. The water droplets 44 are bound with the airborne particles 42 and carry the particles 42 to a high density eliminator 26, made of high-density paper or non-woven cloth. A downstream cooling coil 28 is provided on the opposite side of the high density eliminator 26. As shown in FIG. 2, many of the particles 42, bound to the water droplets, accumulate on the high density eliminator 26. Most of the droplet-bound particles 42 are eventually pulled down by gravity and are collected in collection pan 46 at the bottom of the housing 12. The air, from which most of the airborne particles 42 have been removed, next flows through a low density eliminator 30, made of a low-density fabric curtain material, and then, through a heating coil 32 which heats the air to room temperature. Before exiting the outlet end 48 of the housing 12, the air passes through a chemical filter 34, which removes chemical residues from the air, and through a HEPA filter 36. The HEPA filter 36 is a high-efficiency filter which removes about 99.98% of the airborne particles from the air flowing therethrough. Finally, the purified air 40 emerges from the outlet end 48 of the housing 12 and enters the cleanroom (not shown) of the facility through a suitable air distribution system (not shown).

In FIG. 1, the conventional air purification system 10 uses a large quantity of water to catch and remove the AMCs (Airborne Molecular Contaminants from the outside air, the pH or conductivity value of water used in the conventional air purification system 10 must be precisely controlled at specify value, such as 6.2 or 10 us/cm When the conductivity or pH value of spray water changes, the molecule removing efficiency drops. Thus, the conventional air purification system hard to get better removal efficiency for AMC removal. So we need an additional chemical filter 34 to remove chemical residue from the air. Accordingly, a new and improved air purification system is needed to achieve a better acidic or alkaline molecule removing efficiency without any precise pH value control.

SUMMARY OF THE INVENTION

An object of the invention is to provide a purification system for removing acidic AMCs and alkaline AMCs from a flowing gas without any precise pH value control device.

Another object of the invention is to provide an air purification system suitable for purifying the outside air and introducing the outside air into a cleanroom for the manufacture of semiconductor integrated circuits.

Still another object of the invention is to provide an air purification system efficient and to reduce the quantity of required water.

The invention provides an air purification system for treating pollutants in a gas stream. The air purification system includes a housing with a plurality of nozzles, an acidic water supply device and an alkaline water supply device. The housing introduces the gas stream, the acidic water supply device supplies acidic water for first nozzles to spray acidic mist. The alkaline water supply device supplies alkaline water for second nozzles to spray alkaline mist. The acidic mist and alkaline mist neutralize acidic gas and alkaline gas contained in the gas stream.

In a preferred embodiment, the air scrubber system further includes a porous layer disposed in the housing between the first nozzles and the second nozzles. The porous layer covers a cross section of the housing. The first and second nozzles spray toward the porous layer to remove corrosive gas and particles.

Moreover, the housing has a drain pan to collect water in the housing. The acidic water supply device and the alkaline water supply device are individually connected to the drain pan of the housing, recycling water therefrom. The acidic water supply device is a tower with cation-exchanging resin to reduce cations in the recycled water, forming acidic water pumped by a first pump to the first nozzles. The alkaline water supply device is a tower with anion-exchanging resin to reduce anions in the recycled water, forming alkaline water pumped by a second pump to the second nozzles.

Moreover, the pH value of acidic water supplied by the acidic water supply device is between 4.5 and 6.5. The pH value of alkaline water supplied by the alkaline water supply device is between 7.5 and 9.5.

The invention also provides another air purification system for treating corrosive gases exhausted from semiconductor devices. The air purification system includes a housing with a plurality of filtration modules, a condenser, an acidic water supply device and an alkaline water supply device. Each of the filtration modules includes a porous layer, a plurality of first nozzles and second nozzles. The first nozzles are connected to the acidic water supply device, spraying acidic mist toward the porous layer. The second nozzles are disposed in the housing opposite the first nozzles and connected to the alkaline water supply device, spraying alkaline mist toward the porous. The acidic mist and alkaline mist neutralize acidic gas and alkaline gas contained in the gas stream. The condenser is disposed in the housing at the downstream side with respect to the filtration modules to condense water from the gas stream.

In a preferred embodiment, the housing has a drain pan to collect water in the housing. The acidic water supply device and the alkaline water supply device are individually connected to the drain pan of the housing, recycling water therefrom. The acidic water supply device is a tower with cation-exchanging resin to reduce cations in the recycled water, forming acidic water pumped by a first pump to the first nozzles. The alkaline water supply device is a tower with anion-exchanging resin to reduce anions in the recycled water, forming alkaline water pumped by a second pump to the is second nozzles.

Moreover, the pH value of acidic water supplied by the acidic water supply device is between 4.5 and 6.5. The pH value of alkaline water supplied by the alkaline water supply device is between 7.5 and 8.5.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention can be more fully understood by reading the subsequent detailed description and examples with references made to the accompanying drawings which are given by way of illustration only, and thus are not limitative of the present invention, wherein.

DETAILED DESCRIPTION OF THE INVENTION

The present invention has particularly beneficial utility in removing acidic and alkaline AMCs from air before the air enter into a cleanroom used in the fabrication of semiconductor integrated circuits. However, the invention and is also generally applicable to the removal of acidic and alkaline AMCs from gas or air in a variety of industrial and mechanical applications.

Figure 1:
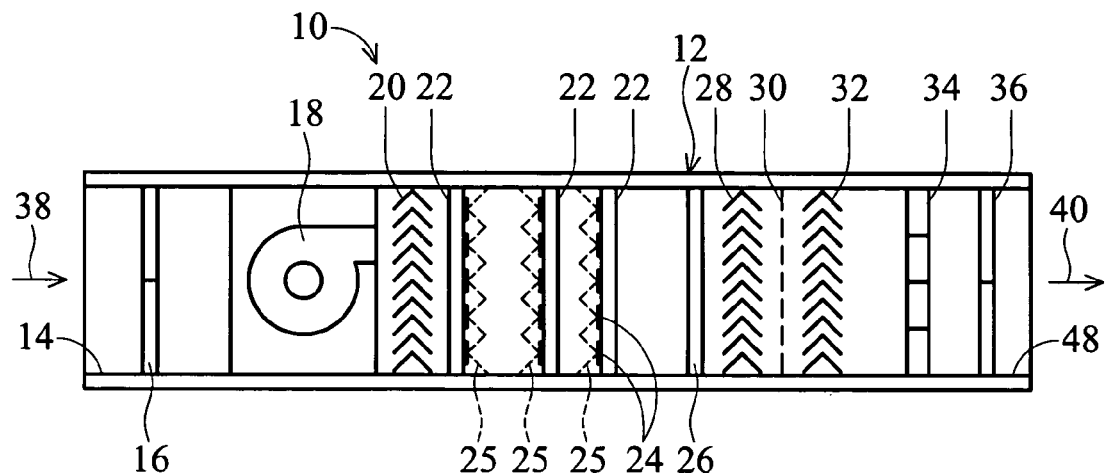
FIG. 1 is a longitudinal sectional schematic view of a conventional air purification system for semiconductor fab cleanrooms.
Figure 2:
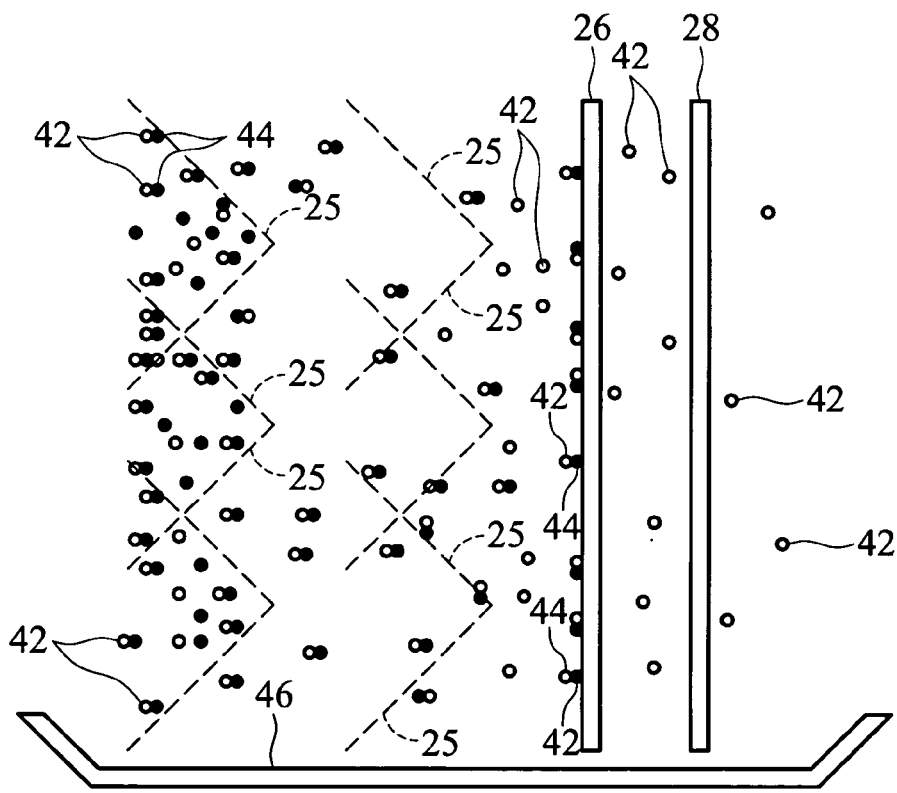
FIG. 2 is a sectional schematic view illustrating removal of particles from air flowing through the system of FIG. 1.
Figure 3:
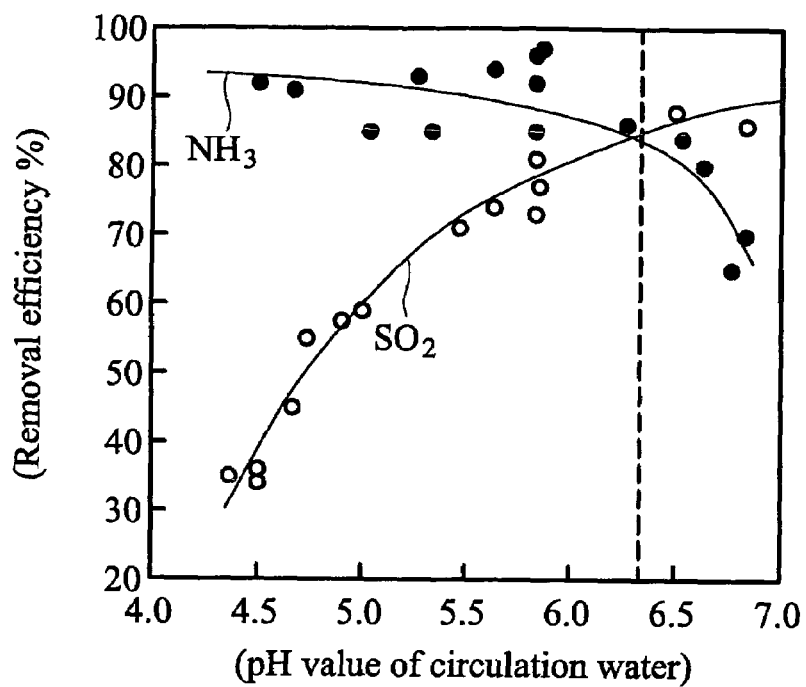
FIG. 3 shows the relative removal efficiency of ammonia and sulfur dioxide with respect to the pH value of the circulated water.

In FIG. 3, when the pH value of circulated water becomes lower than 6.5, the removal efficiency of ammonia rises, but the removal efficiency of sulfur dioxide drops, as well as the removal efficiency of $CO_2$, $N_xO_y$, HCl or other acidic molecules. Otherwise, when the pH value of circulated water exceeds 6.5, the removal efficiency of sulfur dioxide rises, but the removal efficiency of ammonia drops, as well as the removal efficiency of other alkaline molecules. Thus, the air purification system of the present invention provides two kinds of water with different pH values, to individually eliminate acidic AMCs and alkaline AMCs contained in the air, thereby increasing removal efficiency.

Figure 4:
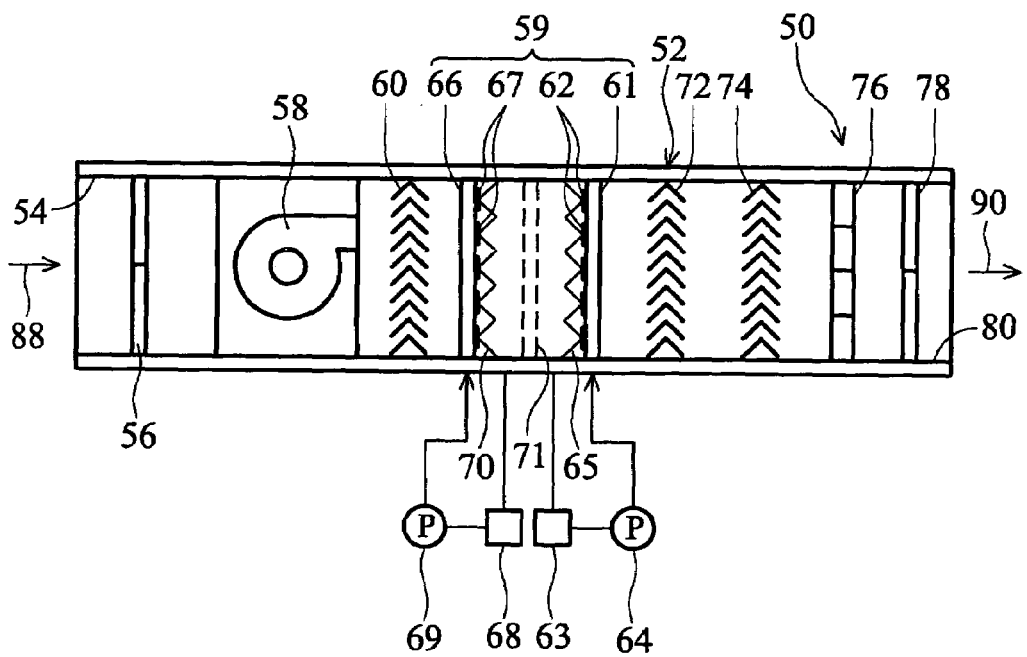
FIG. 4 is a longitudinal sectional schematic view of the air purification system in accordance with an embodiment of the present invention.
Figure 5:
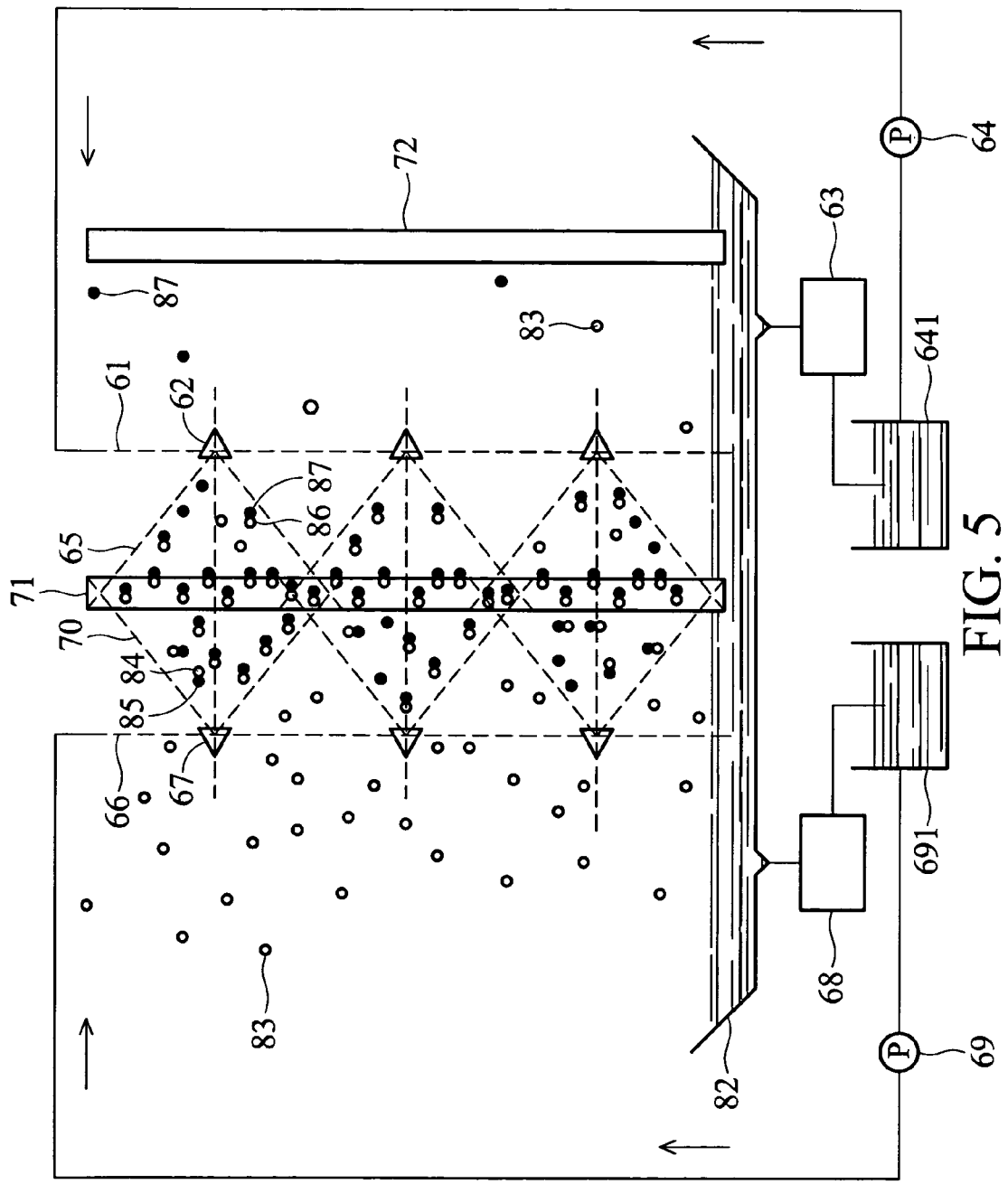
FIG. 5 is a sectional schematic view illustrating removal of acidic or alkaline AMCs from air flowing through the system of FIG. 4, utilizing acidic and alkaline mist.

In FIG. 4, an illustrative embodiment of the air purification system 50 of the present invention includes an elongated housing 52 with an intake end 54 and an outlet end 80. A pre-filter 56 is provided in the housing 52 adjacent to the intake end 54, and a blower 58 is provided downstream of the pre-filter 56. An upstream cooling coil 60 and a downstream cooling coil 72 are provided in the housing 52, downstream of the blower 58.

According to the present invention, at least one filtration module 59 is provided in the housing 52 between the upstream cooling coil 60 and the downstream cooling coil 72. The filtration module 59 includes a first nozzle conduit 66 and a second nozzle conduit 61, individually having a plurality of first spray nozzles 67 and second spray nozzles 62, disposed in the housing 52 downstream of the upstream cooling coil 60. A water droplet trap 71 is disposed between the first nozzle conduit 66 and second nozzle conduit 61. The water droplet trap 71 is a very low-density eliminator made of fabric material, such as a mesh or non-woven sheet.

Furthermore, an acidic water supply device 68 is connected to the first nozzle conduit 66 and supplies acidic water for first nozzles 67 through a first pump 69 to spray acidic mist. An alkaline water supply device 63 is connected to the second nozzle conduit 61 and supplies alkaline water for second nozzles 62 through a second pump 64 to spray alkaline mist. The first nozzles 67 of the first nozzle conduit 66 and the second nozzles 62 of the second nozzle conduit 61 are both directed toward the water droplet trap 71. The acidic mist 70 and alkaline mist 65 neutralize acidic and alkaline AMCs contained in the gas stream 88. The downstream cooling coil 72 is positioned downstream of the second nozzle conduit 61. A chemical filter 76 and a HEPA filter 78 are provided in the housing 52, downstream of the heating coil 74.

In FIGS. 3 and 4, in operation of the air purification system 50 of the present invention, outside air 88 is pumped through the intake end 54 of the housing 52 into the system 50, which purifies the outside air 88 in the manner hereinafter described and discharges the purified air 90 through the outlet end 80 of the housing 52. The purified air 90 is typically introduced into a cleanroom (not shown), such as that of a semiconductor manufacturing facility, for example. Accordingly, the blower 58 initially pumps the outside air 88 into the housing 52 through the intake end 54, after which the air 88 flows initially through the pre-filter 56 and then through the upstream cooling coil 60. The pre-filter 56 removes particles larger than a selected size from the air 88 in conventional fashion. As it passes through the upstream cooling coil 60, the air is cooled to a temperature at or below the dew point (9° C.). Simultaneously, each of the first spray nozzles 67 of the first nozzle conduit 66 generates a diverging acidic water spray 70 that contains a fine mist of acidic water spray droplets 85 toward the water droplet trap 71, as shown in FIG. 4. In the same fashion, each second spray nozzle 62 of the second nozzle conduit 61 generates a diverging alkaline water spray 65, containing a fine mist of alkaline water spray droplets 87 toward the water droplet trap 71. The acidic water spray droplets 85 are capable of neutralizing alkaline AMCs 85, such as ammonia. The alkaline water spray droplets 87 are capable of neutralizing acidic AMCs 86, such as $SO_2$, HCl, HF, $NO_2$ or other acidic molecules. Furthermore, because the first nozzles 67 and the second nozzles 62 are directed toward the water droplet trap 71, the acidic and alkaline water droplets 85, 87 are capable of catching and removing the airborne particles 83 in the flowing air 88. As the acidic and alkaline water spray droplets 85 and 87 accumulate on the water droplet trap 71 and merge with each other to form water droplets of ever-increasing size, water droplets containing the acidic AMCs 84, alkaline AMCs 86 and particles 83 drop and are collected in a drain pan 82 at the bottom of the housing 52. The acidic water supply device 68 and the alkaline water supply device 63 are individually connected to the drain pan 82 of the housing 52, recycling water therefrom. The acidic water supply device 68 is a tower with cation-exchanging resin to reduce cations in the recycled water, forming acidic water stored in an acidic water-storage tank 691 and then pumped by a first pump 69 to the first nozzles 67. The alkaline water supply device 63 is a tower with anion-exchanging resin to reduce anions in the recycled water, forming alkaline water stored in a alkaline water-storage tank 641 and pumped by a second pump 64 to the second nozzles 62 later.

In order to improve the removal efficiency of acidic and alkaline AMCs, the pH value of acidic water supplied by the acidic water supply device is between 4.5 and 6.5, and the pH value of alkaline water supplied by the alkaline water supply device is between 7.5 and 8.5.

Moreover, the acidic water supply device 68 also can be a resin tower or dopes gas, such as $CO_2$, in the recycled water to lower the pH value thereof.

After passing through at least one filtration module 59, the air 88 is devoid of all or most acidic/alkaline AMCs and airborne particles present therein upon entry of the air into the intake end 54 of the housing 52. The air 88 next flows through the cooling coil 72, further condensing water and then through the heating coil raising the temperature of the air 88 to room temperature. Before exiting the outlet end 80 of the housing 52, the air 88 passes though the chemical filter 76, further removing organic or any other chemical residues remaining in the air 88. Finally, the air passes through the HEPA filter 78, removing remaining particles and emerges from the outlet end 80 of the housing 52 as purified air 90 which meets cleanroom standards for air purity.

The purification system of the present invention uses anion-exchanging tower to produce alkaline water and cation-exchanging tower to produce acidic water, and to neutralize acidic and alkaline AMCs in the outside air. The chemical removal efficiency of the air purification system is increased, while avoiding any precise pH value control. Thus, the cost of the system is also reduced.

While the invention has been described by way of example and in terms of the preferred embodiments, it is to be understood that the invention is not limited to the disclosed embodiments. To the contrary, it is intended to covers various modifications and similar arrangements (as would be apparent to those skilled in the art). Therefore, the scope of the appended claims should be accorded the broadest interpretation so as to encompass all such modifications and similar arrangements.

What is claimed is:

1. An air purification system, comprising:

a housing for receiving a stream of air;

an acidic water supply device, generating acidic water;

an alkaline water supply device, generating alkaline water;

a plurality of first nozzles, disposed in the housing and connected to the acidic water supply device, spraying an acidic mist; and a plurality of second nozzles, disposed in the housing opposite the first nozzles and connected to the alkaline water supply device, spraying an alkaline mist.

2. The air purification system as claimed in claim 1, further comprising:

a porous layer, disposed in the housing between the plurality of first nozzles and the plurality of second nozzles.

3. The air purification system as claimed in claim 2, wherein the plurality of first and second nozzles are arranged to spray toward the porous layer.

4. The air purification system as claimed in claim 2, wherein the porous layer covers a cross section of the housing.

5. The air purification system as claimed in claim 1, wherein the housing includes a drain pan to collect water within the housing.

6. The air purification system as claimed in claim 5, wherein the acidic water supply device and the alkaline water supply device are individually connected to the drain pan of the housing, thereby recycling the water collected by the drain pan.

7. The air purification system as claimed in claim 6, wherein the acidic water supply device is a tower with cation-exchanging resin to reduce cations in the recycled water, thereby forming the acidic water.

8. The air purification system as claimed in claim 6, wherein the alkaline water supply device is a tower with anion-exchanging resin to reduce anions in the recycled water, thereby forming the alkaline water.

9. The air purification system as claimed in claim 1, further comprising:
a first pump, connected to the acidic water supply device and the first nozzles, pumping the acidic water from the acidic water supply device to the first nozzles.

10. The air purification system as claimed in claim 1, further comprising:
a second pump, connected to the alkaline water supply device and the second nozzles, pumping the alkaline water from the alkaline water supply device to the second nozzles.

11. The air purification system as claimed in claim 1, wherein the pH value of the acidic water supplied by the acidic water supply device is between 4.5 and 6.5.

12. The air purification system as claimed in claim 1, wherein the pH value of the alkaline water supplied by the alkaline water supply device is between 7.5 and 9.5.

13. An air purification system, comprising:
a housing for receiving a stream of air;
an acidic water supply device, generating acidic water;
an alkaline water supply device, generating alkaline water;
a plurality of filtration modules disposed in the housing, each of the filtration modules comprising:
a porous layer;
a plurality of first nozzles, connected to the acidic water supply device, spraying an acidic mist toward the porous layer; and
a plurality of second nozzles, disposed in the housing opposite the first nozzles and connected to the alkaline water supply device, spraying an alkaline mist toward the porous layer; and
a condenser, disposed in the housing at the downstream side with respect to the plurality filtration modules, condensing the air through the plurality filtration modules into a liquid state.

14. The air purification system as claimed in claim 13, wherein the porous layer covers a cross section of the housing.

15. The air purification system as claimed in claim 13, wherein the housing includes a drain pan to collect water within the housing.

16. The air purification system as claimed in claim 13, wherein the acidic water supply device and the alkaline water supply device are individually connected to the drain pan of the housing, thereby recycling the water collected by the drain pan.

17. The air purification system as claimed in claim 16, wherein the acidic water supply device is a tower with cation-exchanging resin to reduce cations in the recycled water, thereby forming the acidic water.

18. The air purification system as claimed in claim 16, wherein the alkaline water supply device is a tower with anion-exchanging resin to reduce anions in the recycled water, thereby forming the alkaline water.

19. The air purification system as claimed in claim 13, further comprising:
a first pump, connected to the acidic water supply device and the plurality of first nozzles, pumping the acidic water from the acidic water device to the plurality of first nozzles.

20. The air purification system as claimed in claim 13, further comprising:
a second pump, connected to the alkaline water supply device and the plurality of second nozzles, pumping the alkaline water from the alkaline water supply device to the plurality of second nozzles.

21. The air purification system as claimed in claim 13, wherein the pH value of the acidic water supplied by the acidic water supply device is between 4.5 and 6.5.

22. The air purification system as claimed in claim 13, wherein the pH value of the alkaline water supplied by the alkaline water supply device is between 7.5 and 8.5.

23. An air purification system for purifying an air having airborne molecular contaminants, comprising:
a plurality of first nozzles spraying a mist of acidic water droplets to capture the airborne molecular contaminants and neutralize alkaline airborne molecular contaminants;
a plurality of second nozzles spraying a mist of alkaline water droplets to capture the airborne molecular contaminants and neutralize acidic airborne molecular contaminants;
a water droplet trap for trapping the water droplets catching the airborne molecular contaminants, the water droplet trap having a first side and a second side, the first plurality of nozzles being directed toward the first side of the water droplet trap, the second plurality of nozzles being directed toward the second side of the water droplet trap;
an acidic water supply device generating acidic water from the water droplets; and
an alkaline water supply device generating alkaline water from the water droplets.

24. The air purification system of claim 23, further comprising a drain pan for collecting the water droplets capturing the airborne molecular contaminants.

25. The air purification system of claim 24, wherein the acidic water supply device and the alkaline water supply device are connected to the drain pan.

26. The air purification system of claim 25, further comprising:
a first pump connected to the acidic water supply device, pumping the acidic water to the first plurality of nozzles for spraying the mist of acidic water droplets; and
a second pump connected to the alkaline water supply device, pumping the alkaline water to the second plurality of nozzles for spraying the mist of alkaline water droplets.

27. The air purification system of claim 25, wherein the acidic water supply device is a container with cation-exchanging resin to reduce cations in the water droplets collected by the drain pan, thereby generating the acidic water, and the alkaline water supply device is a container with anion-exchanging resin to reduce anions in the water droplets collected by the drain pan, thereby generating the alkaline water.

28. The air purification system of claim 23, wherein the water droplet trap is a porous layer.

29. The air purification system of claim 23, wherein the acidic water droplets have a pH value ranging from 4.5 to 6.5 and the alkaline water droplets have a pH value ranging from 7.5 to 9.5.

30. A method for purifying an air having airborne molecular contaminants operated with the system as claimed in claim 1, comprising:

spraying a mist of acidic water droplets to capture the airborne molecular contaminants;

neutralizing alkaline airborne molecular contaminants with the mist of acidic water;

spraying a mist of alkaline water droplets to capture the airborne molecular contaminants;

neutralizing acidic airborne molecular contaminants with the mist of alkaline water droplets;

trapping the water droplets with the airborne molecular contaminants;

using a first container to generate acidic water for supply the mist of acidic water droplets; and using a second container to generate alkaline water for spraying the mist of alkaline water droplets.

31. The method as claimed in claim 30, wherein the acidic water droplets have a pH value ranging from 4.5 to 6.5 and the alkaline water droplets have a pH value ranging from 7.5 to 9.5.

32. The method as claimed in claim 30, further comprising the step of:

collecting the trapped water droplets;

generating the acidic water from the trapped water droplets; and generating the alkaline water from the trapped water droplets.

33. The method as claimed in claim 32, wherein the acidic water, using the first container with cation-exchanging resin to reduce cations in the trapped water droplets during the step of generating acidic water, and the alkaline water, using the second container with anion-exchanging resin to reduce anions in the trapped water droplets during the step of generating alkaline water.

* * * * *